United States Patent
Sjöö

(10) Patent No.: US 6,793,446 B2
(45) Date of Patent: Sep. 21, 2004

(54) TOOL HOLDER HAVING AN INSERT SEAT WITH AN ELONGATED SLOT FORMING AN EXTENSION OF THE SEAT

(75) Inventor: Sture Sjöö, Gävle (SE)

(73) Assignee: Sandvik AB, Sandviken (SE)

( * ) Notice: Subject to any disclaimer, the term of this patent is extended or adjusted under 35 U.S.C. 154(b) by 22 days.

(21) Appl. No.: 10/058,388

(22) Filed: Jan. 30, 2002

(65) Prior Publication Data

US 2002/0110429 A1 Aug. 15, 2002

(30) Foreign Application Priority Data

Jan. 30, 2001 (SE) .............................. 0100250

(51) Int. Cl.[7] ............................ B23B 29/22; B23D 1/04
(52) U.S. Cl. ........................................ 407/104; 107/87
(58) Field of Search ............................. 407/85, 86, 87, 407/104, 105, 107

(56) References Cited

U.S. PATENT DOCUMENTS

| | | | | |
|---|---|---|---|---|
| 2,988,943 A | * | 6/1961 | Trible | 82/158 |
| 3,066,385 A | * | 12/1962 | Vana | 407/110 |
| 3,171,188 A | * | 3/1965 | Stier | 407/4 |
| 3,229,088 A | | 1/1966 | Olivati | |
| 3,295,187 A | * | 1/1967 | Plummer | 407/67 |
| 3,484,920 A | * | 12/1969 | Werner | 407/6 |
| 3,497,934 A | * | 3/1970 | Hudson | 407/78 |
| 3,611,527 A | * | 10/1971 | Hudson | 407/86 |
| 3,894,322 A | * | 7/1975 | Pano | 407/110 |
| 4,357,123 A | * | 11/1982 | Zweekly | 407/110 |
| 4,533,283 A | | 8/1985 | Satran et al. | |
| 4,664,564 A | | 5/1987 | Loqvist | |
| 5,167,473 A | * | 12/1992 | Barnett | 407/104 |
| 5,536,119 A | * | 7/1996 | Werner et al. | 407/36 |
| 2003/0099519 A1 | * | 5/2003 | Robinson et al. | 407/50 |

FOREIGN PATENT DOCUMENTS

EP 0 184 818 6/1986

* cited by examiner

Primary Examiner—A. L. Wellington
Assistant Examiner—Brian D. Walsh
(74) Attorney, Agent, or Firm—Burns, Doane, Swecker & Mathis, L.L.P.

(57) ABSTRACT

A tool holder for a cutting insert for chip removing machining includes a base body on which is disposed an insert-receiving seat for receiving a cutting insert. The seat includes an insert-support surface and two side surfaces upstanding from the insert-support surface. A slot forms a rear extension of the seat and includes a bottom surface disposed at a lower level than the insert-support surface. The body includes a wing which forms one side of the slot and one of the side surfaces of the insert seat. The side surfaces of the seat diverge in a direction away from the slot. A screw passes through a hole in the wing and extends transversely to a longitudinal direction of the slot. The screw is threadedly received in a hole formed in a side of the slot disposed opposite the wing, so that a tightening of the screw causes the side surfaces of the seat to more tightly grip the insert.

13 Claims, 5 Drawing Sheets

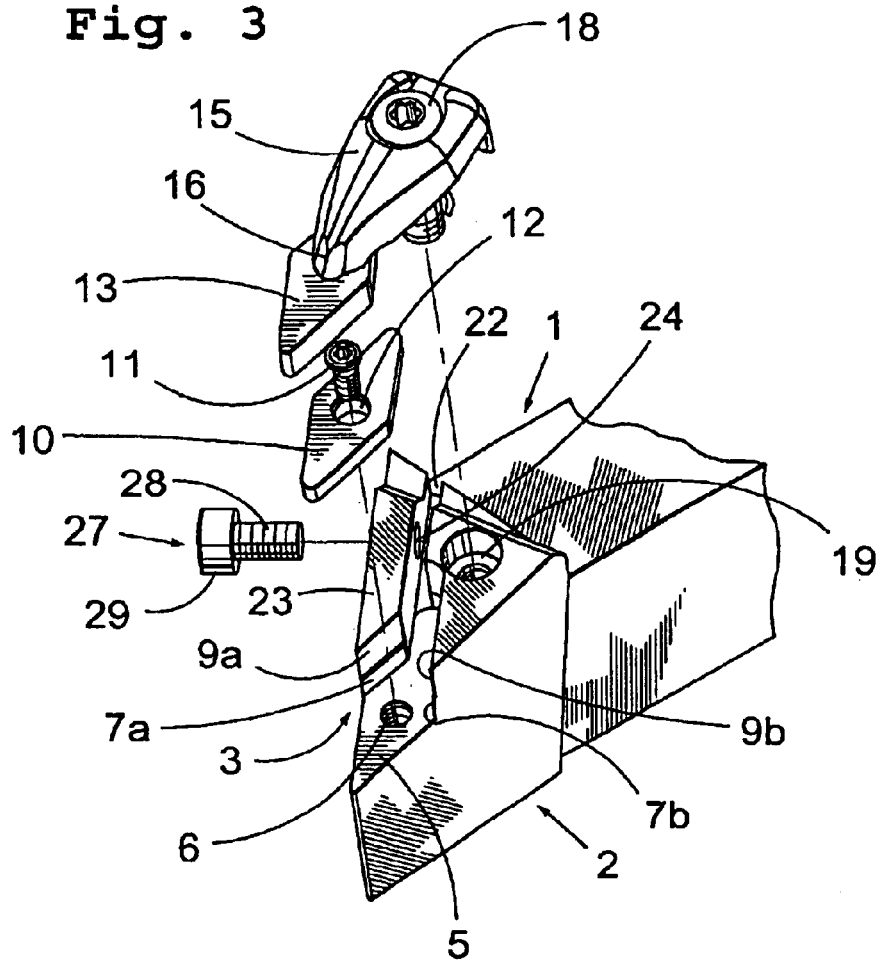
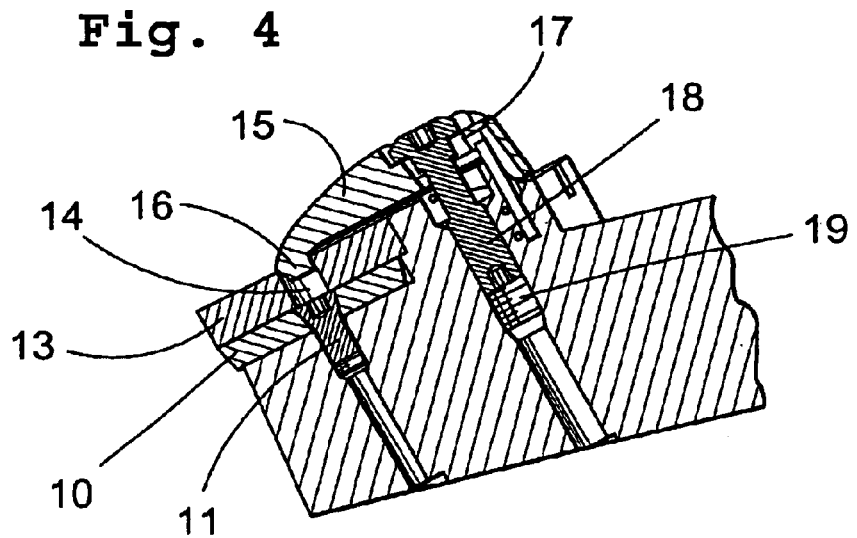

TOOL HOLDER HAVING AN INSERT SEAT WITH AN ELONGATED SLOT FORMING AN EXTENSION OF THE SEAT

This application claims priority under 35 U.S.C. §§119 and/or 365 to patent application Ser. No. 0100250-0 filed in Sweden on Jan. 30, 2001, the entire content of which is hereby incorporated by reference.

TECHNICAL FIELD OF THE INVENTION

The present invention relates to a tool holder for cutting inserts for chip removing machining, the tool holder comprising an insert seat, which comprises two side surfaces, against which side edges of the cutting insert are intended to abut when the cutting insert is mounted in the insert seat, and that the tool holder has members for clamping of the cutting insert in the insert seat or members for receipt of clamping members for the cutting insert.

PRIOR ART

In a leaflet from ISCAR, entitled "ISCAR's New Clamping System for Profiling Tools" conventional prior art is shown, which is illustrated herein in FIGS. 9 and 10, as well as a further development of prior art, which is illustrated in FIG. 11 herein.

As is seen in FIGS. 9 and 10, in the prior art there is disclosed a three-point abutment. In case the cutting insert S is exposed to a force Fc1 acting from the right, see FIG. 9, the cutting insert S will abut at two points CP1 and CP2 against a stiffer side surface 100 of a holder 102 and at one point against a more resilient side surface 104. This is illustrated in FIG. 9 by an angle δ1 formed between the cutting insert S and the more resilient side surface.

If the force Fc2 acting on the cutting insert S comes from the left, see FIG. 10, the cutting insert S will abut against the stiffer side surface at one point CP1 and at two points CP3 and CP4 against the more resilient side surface. This is illustrated in FIG. 10 by an angle δ2 formed between the cutting insert S and the stiffer side surface.

Clamping of the cutting insert S is normally effected with a so-called rocking pin 106, possibly in combination with a top clamp. This has turned out to be insufficient in a number of applications, i.e., the position of the cutting insert is not fixed in the holder to a sufficiently high degree of accuracy. This is particularly valid for this elongated type of cutting insert where large movements of the insert occurs if the cutting insert is exposed to varying loads from differing directions, which is the case during, for instance, copy turning.

As is seen in the prior art illustrated in FIG. 11, the insert seat is provided with a self-adjusting wedge W which abuts against a side surface of the cutting insert, the wedge being movable and self-adjusting to the cutting insert so that a four-point abutment CP1, CP2, CP3A, CP3B is obtained. Since the self-adjusting wedge is movable, the fixation of the cutting insert in the insert seat will be inadequate for certain applications.

A holder for cutting inserts is previously known from EP 0 184 818, the holder having an insert seat, in which a cutting insert is intended to be received. A circular segment-shaped member, which can be swivelled, is arranged in one of the side surfaces which define the insert seat, said member having two abutment points on the side thereof faced towards the cutting insert. In principal, the device according to EP 0 184 818 works in a similar way as the prior art illustrated in FIG. 11.

AIMS AND FEATURES OF THE INVENTION

A primary aim of the present invention is to provide a tool holder of the above-mentioned kind, where an exceptionally accurate clamping of the cutting insert in the insert seat is obtained, this notwithstanding that the cutting insert is exposed to varying loading during, for instance, copy turning. The consequence of this is increased dimensional precision through the use of the tool holder.

Yet another aim of the present invention is to ensure that the cutting insert is fixed in the insert seat by means of a so-called four-point abutment.

Another aim of the present invention is to ensure that certain readjustments of the insert seat should be possible in connection with wear of the insert.

SUMMARY OF THE INVENTION

The present invention relates to a tool holder for a cutting insert for chip removing machining. The holder comprises a base body which forms an insert-receiving seat comprising a first bottom surface and two side surfaces upstanding from the first bottom surface. The base body further includes a slot forming an extension of the seat and including a bottom surface disposed at a lower elevation than the insert-support surface.

Preferably, the base body includes a wing disposed on one side of the slot. The wing forms one of the side surfaces. A screw passes through a hole in the wing and extends transversely to a longitudinal direction of the slot. The screw is threadedly received in a hole formed in a side of the slot disposed opposite to the wing.

BRIEF DESCRIPTION OF THE DRAWINGS

Below a preferred embodiment of the tool holder according to the present invention will be described, reference being made to the accompanying drawings.

FIG. 3 shows, in perspective, an exploded view of the tool holder according to FIG. 1.

FIG. 4 shows a section along line IV—IV in FIG. 1.

DETAILED DESCRIPTION OF A PREFERRED EMBODIMENT OF THE INVENTION

Figure 1:
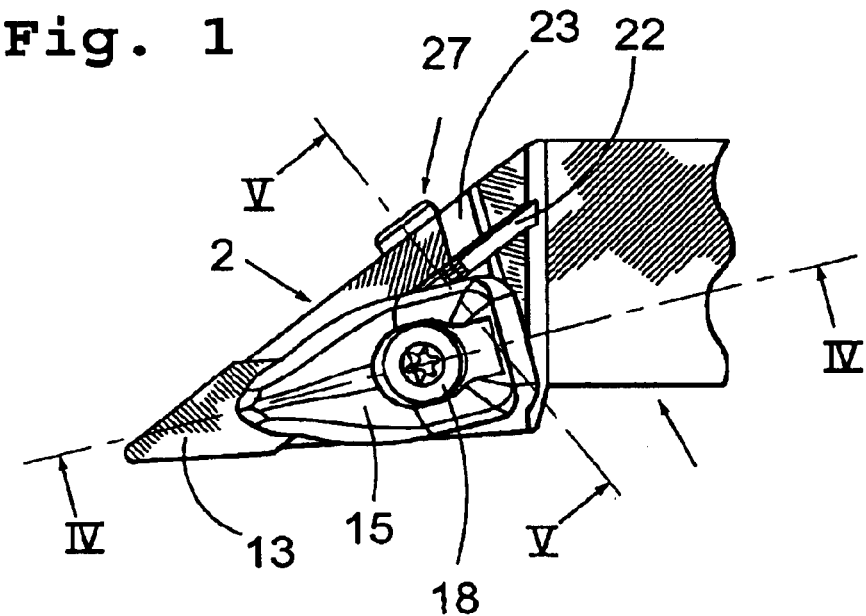
FIG. 1 shows a planar view of a tool holder according to the present invention.

The tool holder according to the present invention illustrated in FIGS. 1–5 comprises a shaft 1, which at one end thereof has a head or base body 2, at which an insert seat 3 is arranged. The body 2 comprises a bottom surface 5, a first internally threaded hole 6 centrally situated in the bottom surface 5, a first side surface 7a, a second side surface 7b, a third side surface 9a and a fourth side surface 9b. The first and second side surfaces 7a and 7b, respectively, are intended to abut against side edges of a shim plate 10, which is also brought into abutment against the bottom surface 5 by means of a first screw 11 which is received in a second through center hole 12 in the shim plate 10 as well as in the first, internally threaded, hole 6 in the bottom surface 5. The third and fourth side surfaces 9a and 9b, respectively, are intended to abut against side edges of a cutting insert 13 for chip removing machining, the cutting insert 13 in the embodiment illustrated being provided with a third center through hole 14.

A clamp 15 is used in the embodiment illustrated for clamping the cutting insert 13, which applies to the cutting insert a vertical force directed against the shim plate 10 and the bottom surface 5, as well as a radial force directed inwards towards an imaginary intersection between the side surfaces 9a and 9b. The clamp 15 has a nose 16, which in the mounted position of the clamp 15 extends down through the center through-hole 14 (i.e., a third through-hole) of the cutting insert 13. The nose also includes a fourth through-hole 17, see FIG. 4, in which a second screw 18 is received, which extends through the fourth through-hole 17 of the clamp 15 as well as into a fifth, internally threaded, hole 19 of the shaft 1 located adjacent to the insert seat 3. In the present patent application, this type of clamp is called a "top-and-hole" clamp 15.

Figure 2:
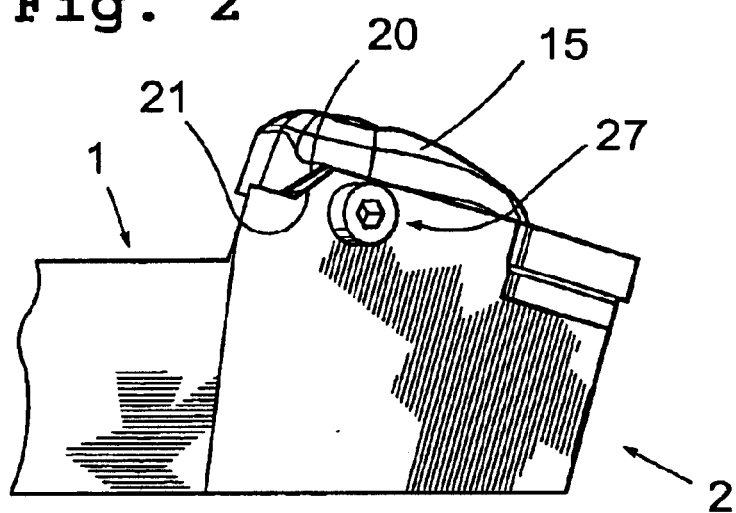
FIG. 2 shows a side view of the tool holder according to FIG. 1.

As is most clearly seen in FIG. 2, a first sloping surface 20 is arranged on the tool holder 1 near the rear end of the top-and-hole clamp 15 when the top-and-hole clamp 15 is mounted in an active position on the tool holder 1. A second sloping surface 21 with the same pitch is arranged on the top-and-hole clamp 15 in the area of the rear end of top-and-hole clamp 15. Said two surfaces 20 and 21 cooperate when the top-and-hole clamp 15 is brought into an active position thereof by tightening the screw 18. In doing so, the top-and-hole clamp 15 will be displaced parallel to the bottom surface 5 in a direction away from the insert seat 3 at the same time as the top-and-hole clamp 15 also is displaced perpendicularly toward the bottom surface 5. Thereby, the top-and-hole clamp 15 will pull the insert 13 into the insert seat 3 and into abutment against the side surfaces 9a and 9b as well as press the cutting insert 13 against the shim plate 10. The thus-far described design of the tool holder 1 and more especially the insert seat 3 in principle represents prior art.

According to the present invention, the head 2 is provided with a slot 22 on the topside thereof, which in the embodiment illustrated extends mainly parallel to the second and fourth side surfaces 7b and 9b, and forms an extension of the insert seat. A wing 23 of the head 2 is defined by the arrangement of the slot 22. The bottom of the slot 22 is mainly in the same plane as the bottom surface 5 of the head 2 and thus is disposed at a lower elevation than the insert-support surface. The wing 23 should not be too slender, which entails that the width of the slot 22 should be less than the width of the wing 23. Preferably, the width of the slot 22 is approximately half of the width/thickness of the wing 23. On one short side of the wing 23, the first and third side surfaces 7a and 9a, respectively, are arranged, said surfaces 7a, 9a forming a certain angle with the longitudinal direction of the wing 23. The length of the side surfaces 7a, 9a should be approximately half of the length of the edge of the cutting insert 13.

Figure 5:
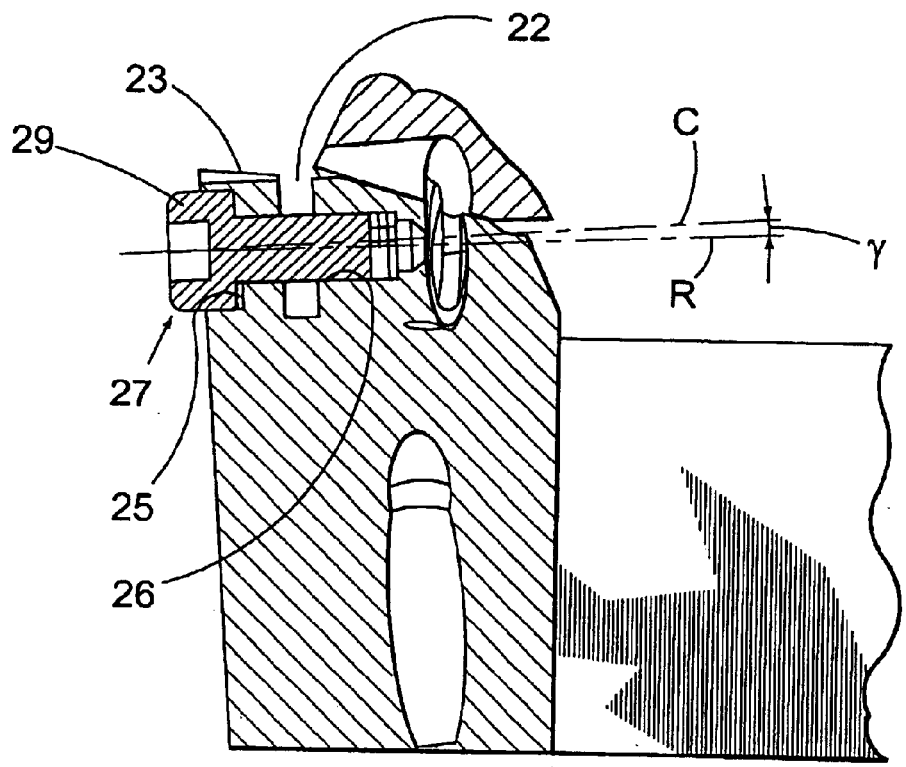
FIG. 5 shows a planar view of a head of the tool holder and the cutting insert with the clamping member removed.

The wing 23 is provided with a sixth through-hole 24, which extends transversely to the longitudinal direction of the slot 22 and the wing 23. The sixth through-hole 24 is provided with a countersink 25 (FIG. 5) and is preferably not threaded. Just opposite the sixth through-hole 24, a seventh, internally threaded hole 26 is arranged in the head 2. The sixth through-hole 24 and the seventh hole 26 have a common longitudinal center axis, which preferably is not perpendicular to the bottom of the countersink 25 in the cross-section illustrated in FIG. 5 (which countersink bottom forms an abutment surface). The angle $\alpha$ that the longitudinal center axis of the holes 24 and 26 forms with a reference line, which is perpendicular to the bottom of the countersink 25, is greater than 0° and less than 5°. Said angle is illustrated in FIG. 5. A third screw 27 is received in the holes 24 and 26, the threaded portion 28 of the screw 27 cooperating with the seventh, internally threaded hole 26 while the head 29 of the screw 27 cooperates with the countersink 25.

When using the tool holder described above, the following procedure should be followed. Initially, the shim plate 10 is mounted on the surface 5, this being achieved by the first screw 11 going through the second hole 12 in the shim plate 10 as well as being secured in the a first hole 6 in the bottom surface 5. In doing so, two side edges of the shim plate 10 abut against the first and second side surfaces 7a and 7b, respectively. Then, the cutting insert 13 is secured by the top-and-hole clamp 15, the nose 16 of which cooperates with the through center hole 14 of the cutting insert 13. The top-and-hole clamp 15 is clamped on the head 2 by the second screw 18, which extends through the top-and-hole clamp 15 as well as into the fifth, internally threaded hole 19.

Tightening of the second screw 18 ensures that the top-and-hole clamp 15 fixes the cutting insert 13 in the insert seat 3, a so-called four-point abutment normally arising between the cutting insert 13 and the third and fourth side surfaces 9a and 9b, respectively, depending on the arrangement of the slot, ensuring that the first side surface 9a is flexible to a certain degree and may adjust itself to the side edge of the cutting insert 13 which comes to abutment against the first side surface 9a. As an additional precautionary measure, a readjustment of the first side surface 9a by tightening of the third screw 27 may be done, which displaces the wing 23 and the side surface 9a toward the side edge of the cutting insert 13. Thereby, it is guaranteed that a two-point abutment is obtained also between the cutting insert 13 and the first side surface 9a. As has been pointed out above, the longitudinal center axis of the hole 26, and thereby also the third longitudinal center axis C of the screw 27, forms an angle $\gamma$ with a reference line R extending perpendicularly to the plane in which the bottom of the countersink 25 is situated. This ensures that the third screw 27 comes into contact with the countersink 25 in the top part thereof in FIG. 5, which is favorable with regard to the torque (longer torque arm) which the screw 27 exerts on the wing 23.

The readjustment of the first side surface 9a also influences compensation of wear of the first side surface 9a as well as compensation for the tolerances that the cutting insert 13 has.

Figure 6:
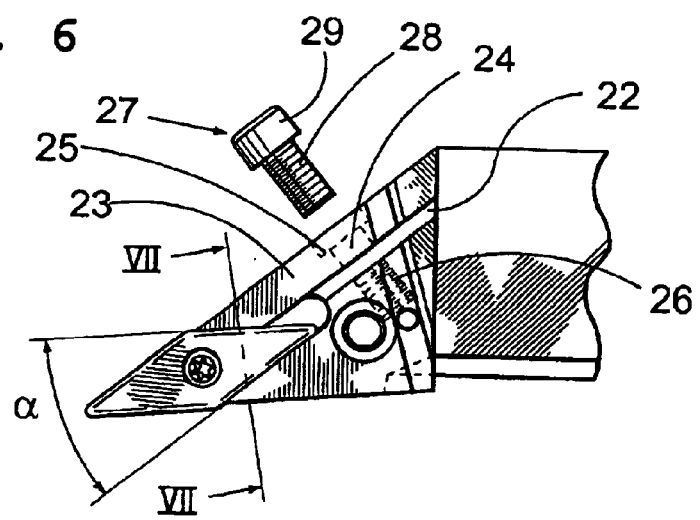
Figure 7:
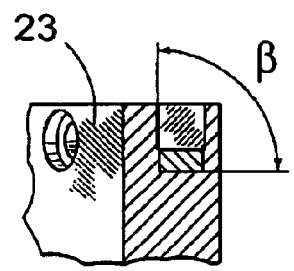
FIG. 7 shows a section along line VII—VII in FIG. 6.
Figure 8:
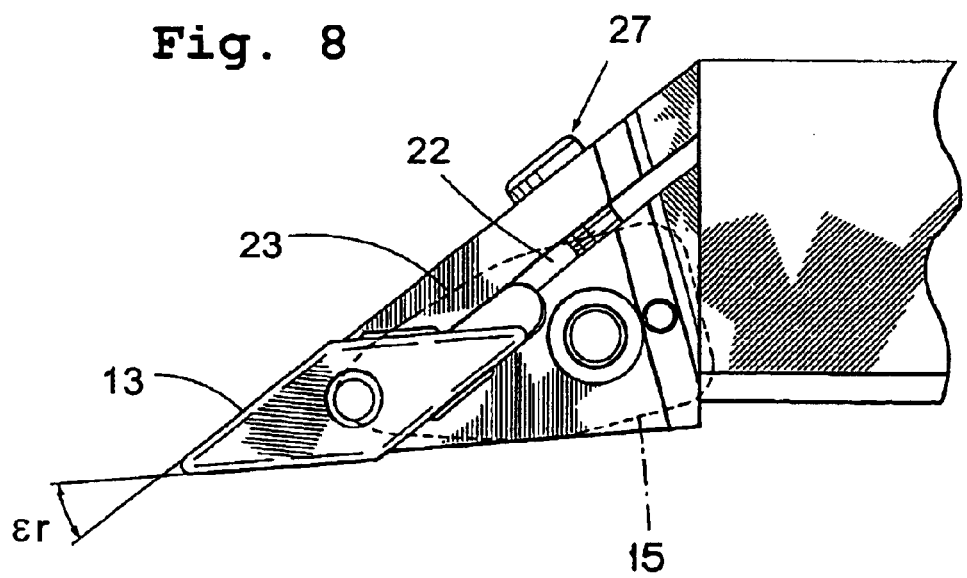
FIG. 8 shows a planar view of a head of the tool holder, the cutting insert being placed in the insert seat and the ideal four-point abutment being illustrated.
Figure 9:
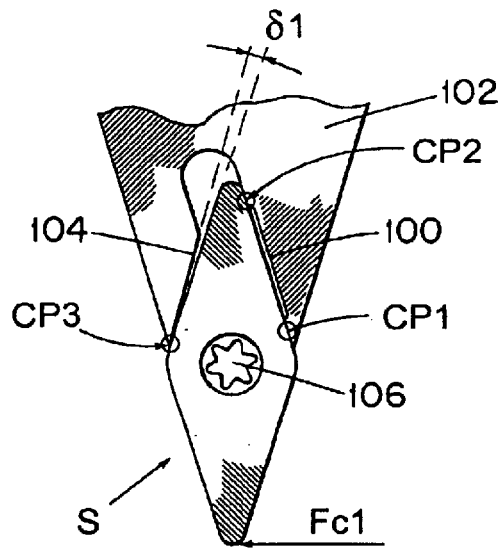
FIG. 9 shows schematically a planar view of the prior art, when the cutting insert is exposed to a force during fastening of a cutting insert in a tool holder.
Figure 10:
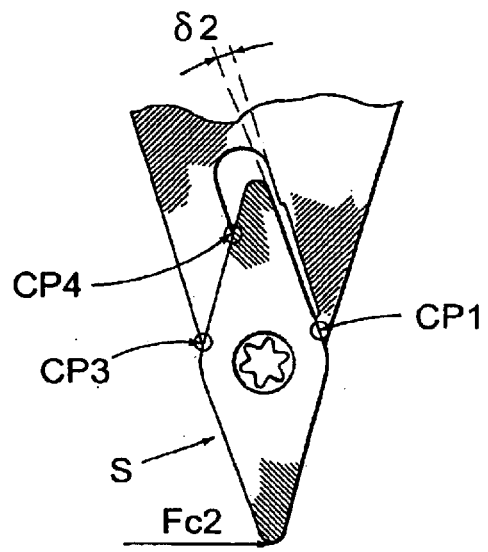
FIG. 10 shows schematically a planar view of the prior art illustrated in FIG. 9, wherein the cutting insert is exposed to a force directed in the opposite direction.
Figure 11:
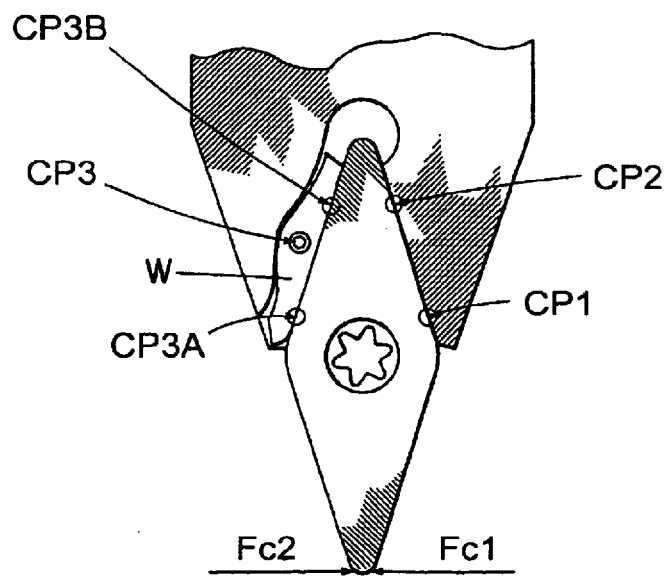
FIG. 11 shows schematically a planar view of a further development in the prior art during fastening of a cutting insert in a tool holder.

On tightening of the third screw 27, a certain displacement of the wing 23 takes place, which is illustrated by the angles $\alpha$, $\beta$ which are shown in FIGS. 6 and 7. On tightening of the third screw 27, the angle $\alpha$, will increase somewhat, which ensures that the cutting insert 13 will seek a fourth abutment point of the side surface 9a if the angle $\alpha$ initially has been made somewhat smaller than the nose angle of the cutting insert 13. This four-point abutment is illustrated in FIG. 8. The insert 13 is secured in the insert seat by a clamp 15, which is shown with a dashed line in FIG. 8. As is seen in FIG. 7, the angle β, will decrease somewhat at tightening of the third screw 27 (due to the angle γ in FIG. 5). Furthermore, the clearance increases between the side surface 9a and the cutting insert 13, which in turn promotes a more symmetrical four-point abutment. In order to further ensure a four-point contact the side surfaces 9a and 9b in FIG. 8 are provided with recesses 8a and 8b in the center of each surface, so that four distinct contact areas are defined.

The cutting insert 13 illustrated in the described embodiment is a rhombic cutting insert which is intended for copy turning. In that connection, it is suitable that angle $\epsilon_r$ illustrated in FIG. 8 is in the interval $30° < \epsilon_r < 60°$.

Feasible Modifications of the Invention

In the above-described embodiment, the third screw 27 extends through the wing 23, whereby a certain readjustment may be done of the wing 23 by means of the third screw 27, as has been described above. However, within the scope of the present invention, it is also feasible to omit the third screw, whereby in that case the wing 23 cannot be made too slender, since it would have to have a certain flexibility so that the cutting insert 13 may seek a fourth abutment point of the side surface 9a of the wing 23 when the cutting insert 13 is fixed in the insert seat 3.

In the above-described embodiment, the cutting insert 13 is anchored in the insert seat 3 by means of a top-and-hole clamp 15. However, within the scope of the present invention, also alternative anchorage members for the cutting insert 13 are feasible, whereby as an exemplifying and not limiting measure, a rocking pin may be mentioned.

In the above-described embodiment, the insert seat 3 is formed to receive a negative cutting insert 13. However, the principles for the present invention are also applicable to insert seats which are intended to receive positive cutting inserts.

In the above-described embodiments, the shim plate 10 forms part of the insert seat, i.e., the shim plate forms a direct support surface for the cutting insert, wherein the bottom surface 5 of the head 2 forms an indirect support surface for the insert. However, within the scope of the present invention, it is also feasible to omit the shim plate, i.e., the insert would rest directly on a surface defined by the bottom surface 5 which would now be raised relative to the showing in FIG. 3 to be situated on the same level with the bottom edges of the third and fourth side surfaces 9a and 9b (the surfaces 7a, 7b being omitted). The raised surface 5 would then form part of the insert seat. However, the bottom surface of the slot 22 would not be raised and thus would continue to be at a lower elevation than the insert-support surface.

The tool holder according to the present invention is primarily intended for rhombic so-called copying inserts. However, within the scope of the present invention, it is also feasible that the principles for the present invention are applicable to tool holders for triangular and square cutting inserts.

Although the present invention has been described in connection with preferred embodiments thereof, it will be appreciated by those skilled in the art that other additions, deletions, modifications, and substitutions not specifically described may be made without departing from the spirit and scope of the invention as defined in the appended claims.

What is claimed is:

1. A tool holder for a cutting insert for chip removing machining, comprising:

a base body on which is disposed an insert seat comprising an insert-support surface and two side surfaces upstanding from the insert-support surface;

the base body including a slot intersected by the side surfaces to form an extension of the seat, the slot including a bottom surface disposed at a lower elevation than the insert-support surface, wherein the side surfaces diverge in a direction away from the slot.

means for displacing one of the side surfaces toward the other side surface.

2. The tool holder according to claim 1 further including a clamp for pressing an insert toward the insert-support surface.

3. The tool holder according to claim 1 wherein the slot extends from the two side surfaces, and further including a shim disposed upon a bottom surface of the base body and engaging both of the side surfaces, the shim defining the insert-support surface.

4. The tool holder according to claim 1 wherein the base body further includes a wing forming one side of the slot and one of the side surfaces of the insert seat.

5. The tool holder according to claim 4 wherein the displacing means comprises a screw passing through a hole in the wing and extending transversely to a longitudinal direction of the slot, the screw being threadedly received in a hole formed in a side of the slot disposed opposite to the wing, wherein a tightening of the screw produces a deformation of the wing to displace the one side surface of the seat toward the other side surface of the seat.

6. The tool holder according to claim 4 wherein a width of the slot is less than a width of the wing.

7. The tool holder according to claim 6 wherein the width of the slot is about one-half the width of the wing.

8. The tool holder according to claim 1 wherein the slot has a width smaller than a largest width of the seat.

9. The tool holder according to claim 1 further including manually actuable means for flexing one of the side surfaces toward the other side surface.

10. A tool holder for a cutting insert for chip removing maching, comprising:

a base body on which is disposed an insert-receiving seat comprising an insert-support surface and two side surfaces upstanding from the insert-support surface;

the base body including a slot forming an extension of the seat and including a bottom surface at a lower elevation than the insert-support surface;

the base body further including a wing forming one side of the slot and one of the side surfaces of the insert seat, the side surfaces diverging in a direction away from the slot;

a screw passing through a hole in the wing and extending transversely to a longitudinal direction of the slot, the screw being treadedly received in a hole forming in a side of the slot disposed opposite to the wing, wherein a tightening of the screw produces a deformation of the wing to displace one of the side surfaces of the seat toward the other side surface of the seat; and a clamp for clamping an insert toward the insert-support surface.

11. A tool holder for a cutting insert for chip removing machining, comprising:

a base body on which is disposed an insert seat comprising an insert-support surface and two side surfaces upstanding from the insert-support surface;

the base body including a slot forming an extension of the seat, the slot including a bottom surface disposed at a lower elevation than the insert-support surface, wherein the slot has a width smaller than a largest width of the seat;

wherein the base body further includes a wing forming one side of the slot and one of the side surfaces of the insert seat; and a screw passing through a hole in the wing and extending transversely to a longitudinal direction of the slot, the screw being threadedly received in a whole formed in a side of the slot disposed opposite to the wing, wherein a tightening of the screw produces a deformation of the wing to displace one of the side surfaces of the seat toward the other side surface of the seat.

12. The tool holder according to claim 11 wherein the wing forms an abutment surface against which a head of the screw abuts, the screw extending non-perpendicularly to the abutment surface.

13. The tool holder according to claim 12 wherein an angle formed between an axis of the screw and the axis of the hole in the wing is less than 5 degrees.

* * * * *